United States Patent [19]

Kidnocker, Jr.

[11] 3,764,982

[45] Oct. 9, 1973

[54] SEQUENTIALLY CODED ACTUATING DEVICE

[76] Inventor: Robert E. Kidnocker, Jr., R.R. No. 8, Box 76, Chillicothe, Ohio 45601

[22] Filed: Aug. 30, 1972

[21] Appl. No.: 284,975

[52] U.S. Cl. ..... 340/147 R, 317/134, 340/147 MD, 340/164 R

[51] Int. Cl. ..... E05b 47/02

[58] Field of Search ..... 340/147 R, 147 MD, 340/365 C; 317/134, DIG. 1

[56] References Cited

UNITED STATES PATENTS

| | | | |
|---|---|---|---|
| 3,659,154 | 4/1972 | Finn | 340/164 R |
| 3,668,660 | 6/1972 | Watten | 340/365 C |
| 3,382,588 | 5/1968 | Serrell et al. | 340/365 C UX |

*Primary Examiner*—Donald J. Yusko
*Attorney*—Lawrence P. Biebel et al.

[57] ABSTRACT

A sequentially coded actuating device has actuation terminals that are a series of conductive areas coated on a non-conductive substrate. The conductive areas may be arranged to provide an artistic configuration, and closing of the terminals is accomplished by bridging gaps between the areas with an externally applied resistive element such as a human finger. This bridging causes placement of an activating potential at the gate of any of several field effect transistors. When a series of gaps are bridged in a predetermined correct sequence, a combination network operates a relay. A series of decoy areas, an activation timer, and a penalty timer make the device additionally secure against unauthorized access.

13 Claims, 2 Drawing Figures

SEQUENTIALLY CODED ACTUATING DEVICE

BACKGROUND OF THE INVENTION

This invention relates to the field of electrical actuation devices and more particularly to actuating devices which are operated in response to a sequential code. Such devices are widely used for locks and security devices applied to safes, automobiles, residential entrances, and the like.

A number of such devices are available in the prior art, and generally they employ an arrangement of push buttons which must be depressed in a predetermined sequence. The push buttons which are used in these prior art devices require a certain amount of effort for actuation, and moreover are in their very nature geometrically restrictive. That is, the buttons are limited in their adaptability to artistically designed control panels.

SUMMARY OF THE INVENTION

This invention provides a sequentially coded actuating device wherein the input terminals for actuation comprise a series of electrically conductive areas with externally exposed gaps therebetween. The actuation circuits are connected to either side of these gaps, and are designed to be activated by placing a human finger or other externally applied resistive element across the gaps. The actuation circuitry is further designed such that bridging of these gaps must occur in a predetermined sequence. Means are provided for resetting the condition of the system if areas are bridged in an improper sequence or if certain additional or decoy areas are bridged at any time.

Since the terminals of this invention are merely conductive areas on a flat surface, there exists a capability to configure the control panel to conform with nearly any desired design. All that is required is that there be provided a series of electrically isolated conductive areas with gaps between these areas and other electrically conductive areas. All electrically conductive areas are coated on a non-conductive substrate, preferably a glass epoxy or plastic material. The conductive areas may be made by any convenient method such as by painting with a conductive paint, or by merely cutting the conductive areas from a thin sheet of conductive material and thereafter bonding them to the surface of the control panel.

Means are provided for limiting the allowed time for completion of the bridging sequence. Other means are provided for bypassing the combination at a special location as well as means for activation of an alarm when an improper combination is inserted into the system. A novel arrangement of field effect transistors and silicon controlled rectifiers is used for implementing the combination logic.

DESCRIPTION OF THE PREFERRED EMBODIMENTS

Figure 1:
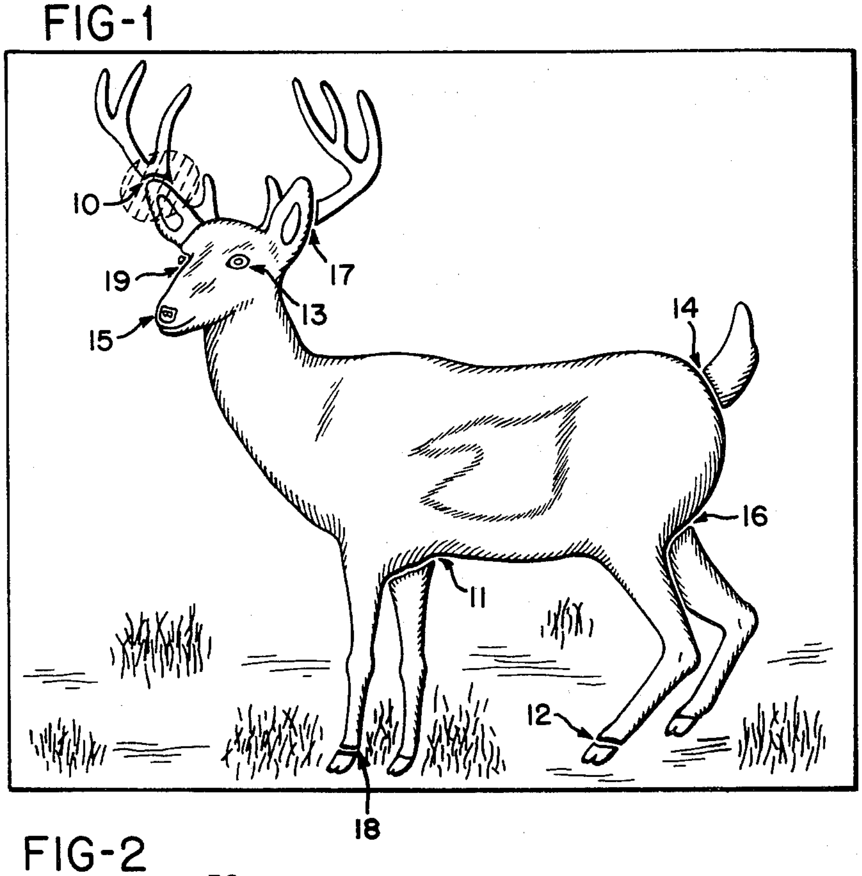
FIG. 1 is an illustration of a typical control panel which may be used in connection with an actuating device made in accordance with this invention.
Figure 2:
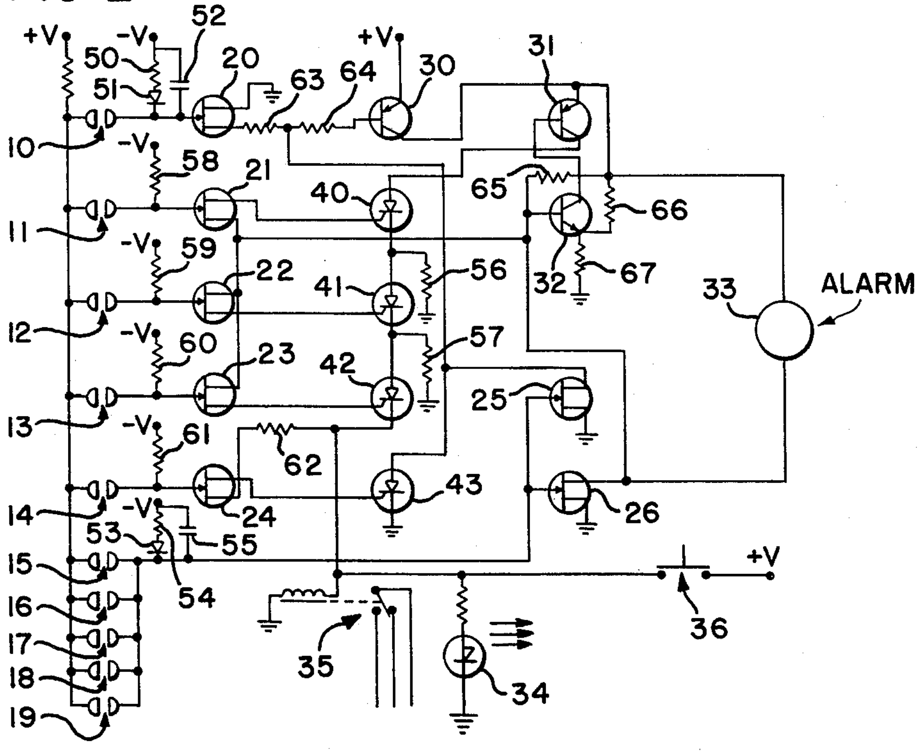
FIG. 2 is an electrical schematic of a preferred embodiment of the invention.

A preferred embodiment of this invention which is illustrated schematically in FIG. 2 comprises a series of terminal pairs 10 through 19 which may be bridged by placing a human finger thereacross. The gaps in terminals 10 through 19 correspond to similarly numbered gaps in the drawing of the deer illustrated in FIG. 1. For instance, if a finger is placed upon the area between the right antler and the right ear (indicated by phantom lines and shading), terminal 10 will be bridged. It will be noted that the conductive area comprising the right antler is isolated from all other conductive areas comprising the control panel. The conductive area comprising the right ear of the deer is part of a large common conductive area and is connected to a source of positive potential as shown in FIG. 2.

When a finger with its inherent resistance of about 200,000 ohms bridges the gap between the right ear and the right antler of the deer as above described, a small current flows through the finger to place a positive potential upon the gate of field effect transistor 20. This makes field effect transistor 20 go into a conductive state which in turn switches on transistor 30 through base resistors 63 and 64. When transistor 30 conducts, the input supply voltage +V appears at the collector thereof and also across resistor 65 to the base of transistor 32. Concomitantly there is a current flow through resistors 66 and 67 to ground. The emitter of transistor 32 is connected between resistors 66 and 67 so that when transistor 30 conducts, transistor 32 is gated on. When transistor 32 turns on, transistor 31 is gated on thereby applying voltage to the anode of SCR 40. Thereafter if terminals 11, 12, and 13 are bridged in sequence, field effect transistors 21, 22 and 23 will be rendered conductive, and SCR devices 40, 41 and 42 will be gated on. Resistors 56 and 57 provide paths to ground for continuous operation of SCR devices 40 and 41. SCR 42 conducts to ground through relay 35 thereby energizing relay 35 which may activate a latch or other controlled mechanism.

Referring again to FIG. 1, it will be seen that bridging of terminals 11, 12 and 13 corresponds to touching the deer at the top of the right front leg, the top of the left rear hoof, and at the edge of the left eye. Thus the actuating device as shown in FIG. 2 may be operated by touching those areas, but only in the proper sequence, and only after first touching area 10.

The sequential bridging requirement can be understood by noting that SCR 42 cannot be switched on until SCR 41 becomes conductive placing a voltage across resistor 57 at the anode of SCR 42. The same is true of SCR 41 which cannot be switched on until after SCR 40 turns on and conducts to ground through resistor 56. It has already been pointed out that no positive potential appears at the anode of SCR 40 until after terminal 10 has been bridged.

If terminals 11, 12 and 13 are bridged in an incorrect sequence, then the apparatus becomes automatically reset. For that purpose field effect transistors 21, 22 and 23 each have their drain terminals connected to the base of transistor 32. The source terminals of field effect transistors 21, 22 and 23 are connected respectively to the gates of SCR devices 40, 41 and 42.

The paths from the SCR gates to the respective SCR cathodes appear as low resistance diodes in the absence of positive anode potentials. Thus if terminal 12, for instance, is bridged before positive voltage appears at the anode of SCR 41, transistor 22 will become conductive and connect the base of transistor 32 to ground through resistor 57 and the gate/cathode junction of SCR 41.

This reverse biases transistor 32 thereby turning off transistors 32 and 31. When transistor 31 turns off, SCR 40 is gated off, and the apparatus is reset to the condition which obtained prior to the bridging of terminal 11. A similar reset sequence occurs if terminal 13 is bridged after the bridging of terminal 10 and prior to the bridging of either terminals 11 or 12.

The resistance of resistor 57 is fairly low so that during the above described reset sequence, there is a sizable voltage drop across resistor 65. This voltage appears across the terminals of reset alarm 33 causing activation thereof. Alarm 33 may be a whistle, siren, flashing light, or other convenient device and may be self-latching if desired. Typically resistors 57 and 65 may have resistances of about 3,000 ohms and 36,000 ohms respectively, and the system input potential may be about 9 volts.

Resetting of the apparatus also occurs whenever any of terminals 15 through 19 is bridged. When one of these terminals is bridged, a positive potential is supplied to the gate of FET 26. FET 26 therefore becomes conductive and provides a low resistance path to ground for the base of transistor 32. Transistors 32 and 31 are again shut off and alarm 33 is activated. As further shown in FIG. 2, a penalty timer is activated whenever any of terminals 15 through 19 are bridged. The penalty timer consists of diode 53, resistor 54 and capacitor 55. This timer functions in a manner like the hereinafter described timer which controls the gate of FET 20. Thus the penalty timer maintains FET 26 conductive for a predetermined period of time. No matter what combination of terminals is bridged during this period of time, relay 35 cannot be actuated.

The timer which controls the gate of FET 20 provides a safety timing feature for preventing operation of relay 35 unless the entire correct bridging sequence is completed within a predetermined period of time. The elements which provide this safety timing feature are resistor 50, diode 51 and capacitor 52. When terminal 10 is bridged to turn on FET 20, capacitor 52 is charged for maintenance of an activating positive potential at the gate of FET 20. Thus FET 20 continues to conduct after the finger has been removed from terminal 10. This maintains transistors 30, 31 and 32 in an operational state. However, capacitor 52 discharges slowly through the leakage path provided by resistor 50 and diode 51.

As the charge across capacitor 52 leaks away, a threshold point is eventually reached at which FET 20 ceases to conduct, and the base drive is removed from transistor 30. Resistor 50 and capacitor 52 may be selected so as to provide activation over a relatively wide time range. Typically resistor 50 may have a resistance of around 10 megohms and capacitor 52 may have a capacitance of about 0.1 microfarads. This provides an activation time of about 30 seconds. Reducing the capacitance of capacitor 52 down to about 0.033 microfarads reduces the activation time to about 10 seconds. It will be noted that alarm 33 is not actuated by the discharging of capacitor 52. FET devices 21, 22 and 23 are provided with simple input loading resistors 58, 59 and 60 at their respective gates, so that these transistors are deactivated immediately upon removal of the finger from terminals 11, 12 and 13 respectively.

It will be appreciated that the circuit as above described draws no current during the inactive state prior to bridging of terminal 10. Thereafter current is drawn only while the timer is on and while relay 35 is energized. This makes the device very economical to operate.

The apparatus as illustrated in FIG. 2 also has a holding feature which is initiated by bridging of terminal 14 after sequential bridging of terminals 10, 11, 12 and 13. Bridging of terminal 14 completes a circuit through resistor 61 and applies a positive potential to the gate of FET 24. Then if SCR 42 is in the conductive state, SCR 43 sees the output of SCR 42 through FET 24 and resistor 62, and in turn is gated on. This provides a path to ground from the base of transistor 30 through resistor 64 and SCR 43. Thus transistor 30 continues to conduct even after FET 20 shuts off, and relay 35 continues to hold an active state. This holding action may be cancelled by bridging of any of the reset terminals 15 through 19. When one of these terminals is bridged, FET 25 is turned on and SCR 43 is turned off. Turning off SCR 43 puts transistor 30 back under the control of FET 20.

As optional features, the apparatus of this invention may comprise a light emitting diode 34 and a manual operating switch 36. Light emitting diode 34 may be mounted on the face of the panel illustrated in FIG. 1, and provides a visual indication that relay 35 has been operated. Manual operate switch 36 is placed at a remote location to enable operation of relay 35 without sequential bridging of terminals 10 through 13.

It is apparent that a sequentially coded actuating device made in accordance with the practice of this invention may be made as secure as desired by increasing the number of operating terminals such as terminals 10 through 13 and the number of reset terminals such as 15 through 19. Furthermore, the device may be made secure against detection of the combination by adding diodes to the reset lines and providing each input line with the same impedance.

While the form of apparatus herein described, constitutes a preferred embodiment of the invention, it is to be understood that the invention is not limited to this precise form of apparatus, and that chamges may be made therein without departing from the scope of the invention.

What is claimed is:

1. A sequentially coded actuating device comprising:

a housing, a face plate covering said housing, a design on said face plate comprising a primary conductive area and a plurality of secondary conductive area segments, said secondary conductive area segments being separated from each other and from said primary conductive area by nonconductive gaps and the gap between each secondary area and said primary area being configured for bridging by an externally applied resistive element, a combination network activated by bridging of the gaps between certain of said secondary areas and said primary area in a predetermined sequence, means connected between said primary conductive area and other of said secondary conductive areas for resetting said combination network whenever any of the gaps between said other secondary conductive areas and said primary conductive area is bridged, and means responsive to activation of said combination network for generating an actuating signal.

2. Apparatus according to claim 1 further comprising a time delay circuit activated by bridging the first gap in the sequence for activation of said combination network and operative to deenergize said network after elapse of a predetermined delay period.

3. Apparatus according to claim 2 further comprising means operable upon activation of said combination network for inhibiting said deenergization and thereby holding the generation of said actuating signal.

4. Apparatus according to claim 1 said combination network comprising a series of field effect transistors with their gates connected to said certain secondary areas, and means for rendering said field effect transistors conductive when the gaps between their associated secondary areas and said primary area are bridged.

5. Apparatus according to claim 4 said combination network further comprising a series of cascaded silicon controlled rectifiers with their gates connected to said field effect transistors, and means for sequential activation of said silicon controlled rectifiers when their associated field effect transistors are rendered conductive by bridging of the gaps between said certain of said secondary areas and said primary area in said sequence.

6. Apparatus according to claim 5 further comprising means connected to the second and subsequent of said silicon controlled rectifiers for gating off all of said silicon controlled rectifiers whenever any of said field effect transistors are prematurely rendered conductive.

7. A sequentially coded actuating device comprising:
a series of terminal pairs, each pair being arranged for bridging by an externally applied resistive element,
a series of field effect transistors arranged whereby each transistor is rendered conductive by bridging of an associated terminal pair,
means for generating an actuating signal when said terminal pairs are bridged in a predetermined sequence and said field effect transistors are rendered conductive in a corresponding sequence, and
a time delay circuit activated when the first field effect transistor in said sequence is rendered conductive and operative to reset said means for generating an actuating signal to the condition obtaining prior to bridging of the first terminal pair in said sequence if the last terminal pair in said sequence is not bridged within a predetermined time.

8. Apparatus according to claim 7 further comprising a second series of terminal pairs, each pair being arranged for bridging by an externally applied resistive element and each pair when bridged being operative to reset said means for generating an actuating signal to the condition obtaining immediately prior to bridging of the second terminal pair in aforesaid sequence.

9. Apparatus according to claim 8, said series of terminal pairs and said second series of terminal pairs both being arranged whereby bridging any of the individual terminal pairs may be performed by the touch of a human finger.

10. Apparatus according to claim 8 further comprising means activated upon bridging of any terminal pair in said second series and operative for a predetermined period of time to hold said means for generating an actuating signal in the state to which it is reset by said bridging.

11. Apparatus according to claim 10 further comprising a reset alarm activated by bridging of any terminal pair of said second series.

12. Apparatus according to claim 10 further comprising alternative means for bypassing said terminal pairs and generating said actuating signal directly.

13. Apparatus according to claim 10 further comprising a visual indicator activated upon generation of said actuating signal.

* * * * *